Aug. 18, 1964   R. L. B. GUMAELIUS   3,144,717
CHILD HEIGHT MEASURING AND STATUS RECORDING DEVICE
Filed Oct. 11, 1962
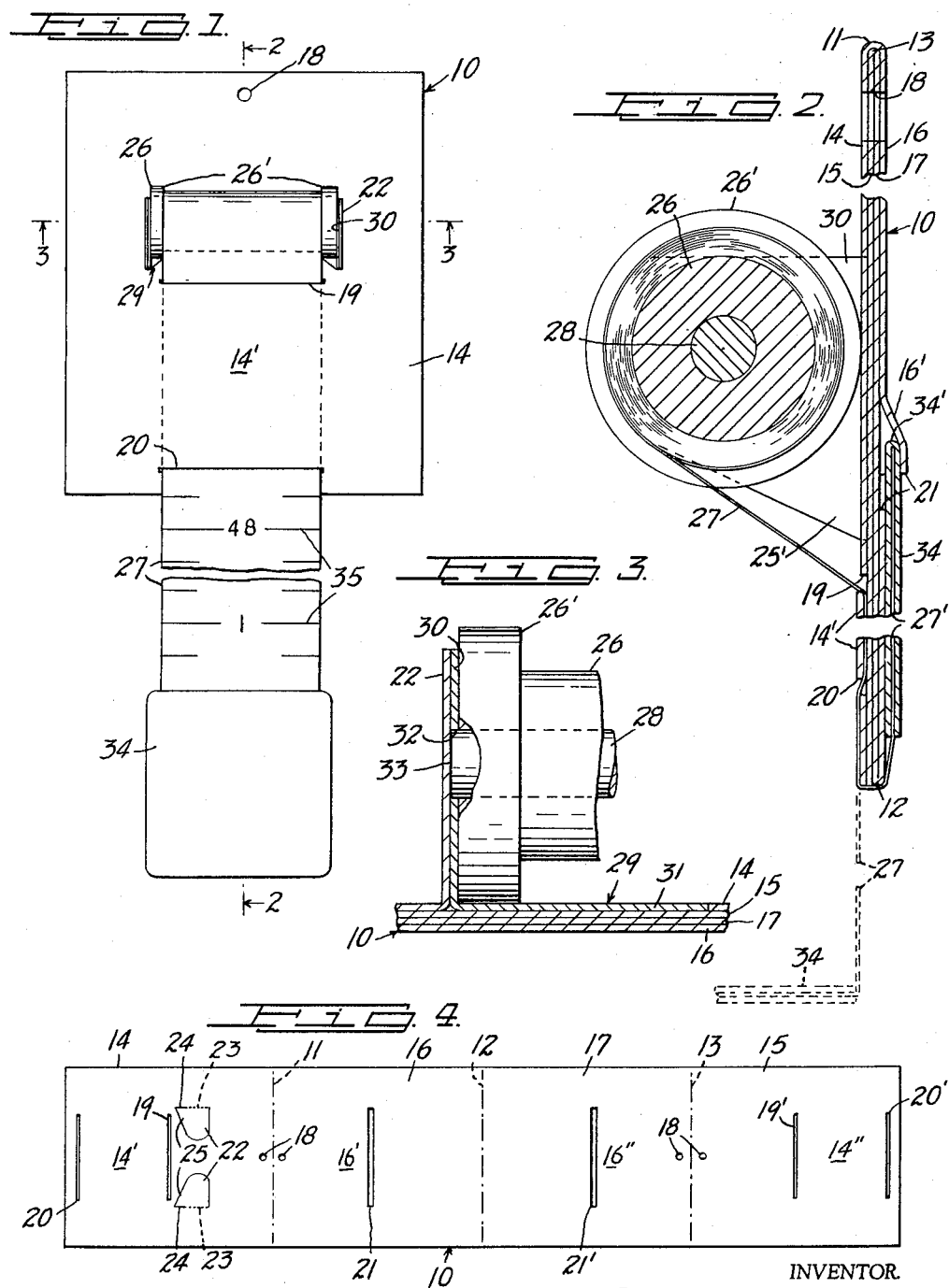
INVENTOR.
ROBERT L. B. GUMAELIUS
BY
Howard C. Thompson
ATTORNEY

United States Patent Office 3,144,717
Patented Aug. 18, 1964

3,144,717
CHILD HEIGHT MEASURING AND
STATUS RECORDING DEVICE
Robert L. B. Gumaelius, 38—31 218th St., Bayside, N.Y.
Filed Oct. 11, 1962, Ser. No. 229,858
6 Claims. (Cl. 33—138)

This invention relates to devices adapted for use in the home for measuring the height of a child during his or her growth, as well as to provide on the device surfaces having printed notations thereon for recording the status of the child or, in other words, the various events, sicknesses and various matters dealing with health, so that the parents will have a definite hostory of the foregoing, not only for their own use, but for use by physicians and/or to check with physicians' records.

More particularly, the invention deals with a device of the character described having means for supporting a spool thereon, upon which is wound an elongated measuring tape, including a foot tab end, the device including means for supporting the foot tab end upon the back wall of the devices when the device is not in use.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic face view of a device made according to my invention, showing the measuring tape partly extended from the device and with part broken away.

FIG. 2 is an enlarged partial section on the line 2—2 of FIG. 1 showing the measuring tape in side elevation and illustrating the device in collapsed or non-use position in full lines and with the measuring tape and foot tab extended from the device in dotted lines.

FIG. 3 is a partial section on the line 3—3 of FIG. 1 on an enlarged scale and omitting the showing of the measuring tape on the supporting spool, with part of the spool broken away; and FIG. 4 is a diagrammatic plan view of the body portion of the device in extended position, preparatory to the assemblage of parts therewith and illustrating a slight modification over the showing in FIG. 2.

For many years, it has been the practice in many homes to periodically measure the height of children during their growth and, invariably, this operation was performed on a doorframe, against which the child would stand, the frame being periodically marked to indicate this growth. The purpose of my invention is to provide a practical device which can be hung on any wall or vertical support to periodically care for the measuring of children's heights while, at the same time, providing a device, the body portion of which will have exposed surfaces preprinted with data thereon, for recording various children's diseases and incidents or data pertaining to the treatment of the child from time to time so that a complete record of the child will be available at the home for consideration by the parents, as well as an attending physician, as well as any other data that would be of interest to the parents for emergency or first air treatments of a child.

In illustrating one adaptation and use of my invention, I have illustrated a device in its simplest and most economical form, the body of which will be formed from an elongated sheet of suitable paperboard, which can be printed or lithographed. Considering FIGS. 1 and 2 of the drawing, this body portion is generally identified by the reference character 10 and is shown in extended blank position in FIG. 4 of the drawing. The blank is scored at 11, 12 and 13, as indicated by dot-dash lines, to divide the body portion into end walls 14 and 15 and walls 16 and 17 hinged to each other at 12 and to the walls 14 and 15 at 11 and 13, respectively. The wall 14 becomes the front wall of the hinged device, as shown in FIGS. 1 and 2. The wall 16 becomes the back wall and the walls 15 and 17 become intermediate walls, as clearly noted in FIG. 2. Adjacent surfaces of the walls 15 and 16 are unattached and hinge about the folds 11 and 12, so that said adjacent surfaces of 15 and 16, when the device is extended, can have printed thereon some of the data noted above; whereas, the rear exposed surface of the wall 16 can have the remainder of the data printed thereon, this last surface preferably including the emergency or first aid treatment information which would become readily available in removing the device from its support, as later noted.

Adjacent surfaces of the walls 14 and 15 are at least partially adhered together and particularly at peripheral edges thereof and this is also true of adjacent surfaces of the walls 16 and 17, this adhesive treatment being such as to permit flexure of certain of the walls for purposes later noted.

The walls 14 and 16, as well as the walls 15 and 17, have, centrally thereof and adjacent the folds 11 and 13, registering perforations, as indicated at 18, which collectively form an aperture, as clearly noted in FIGS. 1 and 2 of the drawing, for hanging the device in connection with any suitable vertical support.

Considering FIG. 4 of the drawing, the wall 14 has a pair of spaced transverse slits or apertures 19 and 20 and the wall 16 has a transverse slit or aperture 21. Adjacent the slit 19, the wall 14 is die cut and scored to form a pair of spool supporting members 22, the scoring being indicated at 23 in dotted lines and in alinement with the scoring is a short die cut 24 which provides on each of the members angular bracing portions 25 to resist downward pull on a spool 26 supported in the members 22 as and when the measuring tape or band 27 is drawn downwardly to extend the same in taking a measurement, it being understood that one end of the tape or band is suitably affixed to the spool 26.

The spool 26 is rotatably mounted on a pin or shaft 28 and, as and when the spool 26 is composed of wood or similar material, the shaft 28 can be composed of wood, but another material, such for example as plastic, could be used or a metal rod.

Considering FIG. 3 of the drawing, it will appear that supplemental bearing members 29 are employed in conjunction with the members 22 and, while only one of each of these members 22 and 29 are shown in FIG. 3, it will be understood that the opposed end of the spool will have similar supports. Each of the members 29 are die cut to form a portion 30, conforming to the contour of the members 22 and a portion 31 which conforms to the aperture formed in the wall 12 when the members 22 are arranged perpendicularly to the wall and each of the members 29 has an aperture 32 therein, into which the ends of the pin or shaft 28 extend and said ends 33 are adhesively or otherwise fixed to the adjacent surface of the members 22, so that 28 is held against rotation. It will, thus, be apparent that the spool 26 rotates on 28. The portion 30 can be adhesively secured to the member 22 and this is also true of securing the portion 31 of 29 to the surface of the wall 15 engaged thereby, as will be clearly apparent from a consideration of FIG. 3 of the drawing. The extension of the part 30 of 29 comparable to the angular extensions 25, noted in FIG. 4, is illustrated at 25′ in FIG. 2 of the drawing. It will, thus, be apparent that these extensions 25, 25′ will resist the downward pull on the spool, as and when the tape or band 22 is drawn downwardly through the device in the taking of a measurement. The tape or band is retrieved on the spool by simply turning the spool by hand, utilizing the enlarged diameter ends 26' of the spool for this purpose.

In assemblage of the device, the tape or band 27 is passed inwardly through the aperture 19 and, then, beneath the outwardly flexed portion 14' of the wall 14 and then out through the other aperture 20, as clearly noted in FIG. 2 of the drawing. The outwardly flexed portion 14' will provide slight friction in control of the winding and unwinding of the tape or band. Engagement of the ends of the spool 26 with the portions 30 will provide other friction to retain the tape or band from unwinding on the spool.

Considering FIG. 2 of the drawing, it will be apparent that a portion of the wall 16 above the aperture 21 therein, namely the portion 16', will also be flexed outwardly to facilitate insertion of one end of a foot tab 34 therein in securing said tab upon the rear surface of the device when the device is not in measuring use. The tab 34 comprises a single rectangular sheet, between which the end of the tape or band 27 is secured, as indicated at 27' in FIG. 2, the fold in the tab being indicated at 34'. The foot tab 34 is used as a fingerpiece to pull the tape or band downwardly to be positioned on a floor or other surface, upon which a child is to stand, as indicated in dotted lines in FIG. 2 of the drawing and the tape or band has inch markings thereon, as diagrammatically illustrated, in part, at 35 in FIG. 1 of the drawing, the lower portion of the band starting with the one inch, with half inch markings noted therebetween and the upper broken away portion illustrating a forty-eight inch marking. The length of the tape or band can be such as to measure the growth of children or can be of such height as to measure growth heights. The tape or band can have arranged longitudinally thereof various picture illustrations which may be attractive to a child and this tape or band can be composed of any suitable sheet material and, in some instances, plastic material can be used. While, in FIG. 2 of the drawing, the apertures 19 and 20 are only formed in the wall 14, these apertures could also be formed in the wall 15, as illustrated at 19' and 20' in FIG. 4, and this is also true of the aperture 21 formed in the wall 16, as indicated by the aperture 21' in the wall 17. With these modified adaptations, the tape or band 27 would pass between adjacent surfaces of the walls 15 and 17 and the tab would have its end also extending to a position between said walls 15 and 17. In other words, the flexible portions, as at 14' and 16', would extend to the walls 15 and the walls 17, respectively, as indicated at 14" and 16" in FIG. 4.

The exposed surface of the front wall 14 of the device can be characterized in any desired manner. However, the more important characterizations would be those applied to adjacent surfaces of the walls 15 and 17, so that, when these walls are extended on the joint hinges 11 and 13, the surfaces would be exposed to make recordings thereon, such as noted above, giving dates, for example, of any of the conventional illnesses or diseases, as, for example, chicken pox, measles, mumps, whooping-cough, scarlet fever, diphtheria or the like, as well as recordings for any type and kind of surgical treatment, X-rays and the like to provide a complete history of the child which can be used as a future reference by the parents, as well as an attending physician. In like manner, the rear surface of the wall 16 can, in addition to having information with regard to emergency or first aid treatment, have data pertaining to the child's birth, development, such as first tooth, walking, etc. and any other data that would be suitable for a device of the type and kind under consideration. It will, thus, be apparent that, in addition to providing a practical means for periodically measuring a child's height, the device serves a useful purpose by virtue of the recorded data contained on the printed or marked surfaces of the device. From this standpoint, one of these devices should be used for each child and the various subjects checked from one child to the other, particularly in having a complete history of each child and, after the child has grown up, it would further be practical that at least the history portion of the device be retained by the child or the matured individual for future reference. Many times, it occurs that an older person is not aware of the fact of whether he or she had the infant illnesses, such as chicken pox, measles, mumps, whooping-cough or the like, and it is extremely important that the matured person knows whether he or she had the latter two illnesses, as there can be serious with the matured person.

While devices of the type and kind under consideration can be generally sold through various store outlets, they also can be distributed by physicians attending the birth of a child or by hospitals where the child is born and, in such instances, the initial data pertaining to the child's weight, length, color of hair, color of eyes, etc. can be recorded, as well as footprints and fingerprints. In this way, the parents will have the initial start of the recordings that can be made by them as the child grows and, as previously noted, this can be kept by the individual for future reference.

Having fully described my invention, what I claim as new and desire to secure by Letters Patent is:

1. A device of the character defined comprising a body composed of a plurality of walls arranged one upon the other, at least part of said walls being secured together, one wall constituting a front wall, another a back wall, spool supporting members projecting from the front wall, means forming a rotatable mounting of a spool on said members, an elongated tape characterized with inch makings thereupon wound upon said spool, said front wall having spaced apertures, through which the tape passes in withdrawing the tape from said spool and re-winding the tape thereon, said device including means facilitating attachment of the device to a support, a tab at the free end portion of the tape forming means facilitating withdrawal of the tape from the spool of said device, and said back wall including means for engaging and supporting the tab thereon when the device is not in measuring use.

2. A device of the character defined comprising a body composed of a plurality of walls arranged one upon the other, at least part of said walls being secured together, one wall constituting a front wall, another a back wall, spool supporting members projecting from the front wall, means forming a rotatable mounting of a spool on said members, an elongated tape characterized with inch markings thereon wound upon said spool, said front wall having spaced apertures, through which the tape passes in withdrawing the tape from said spool and re-winding the tape thereon, said derive including means facilitating attachment of the device to a support, a tab at the free end portion of the tape forming means facilitating withdrawal of the tape from the spool of said device, said spool supporting members being integral with the front wall and foldable relatively thereto, supplemental bearing members constituting part of the first named bearing members, said supplemental bearing members being apertured to receive the first named means, and said first named means being fixed to said spool supporting members.

3. A device as defined in claim 2, wherein said members and supplemental bearing members include means for bracing the same to resist downward pull on said spool.

4. A device of the character defined comprising a body composed of a plurality of walls arranged one upon the other, at least part of said walls being secured together, one wall constituting a front wall, another a back wall, spool supporting members projecting from the front wall, means forming a rotatable mounting of a spool on said members, an elongated tape characterized with inch markings thereon wound upon said spool, said front wall having spaced apertures, through which the tape passes in withdrawing the tape from said spool and re-winding the tape thereon, said device including means facilitating attachment of the device to a support, a tab at the free end portion of the tape forming means facilitating withdrawal of the tape from the spool of said device, the front and back walls being hingedly united for exposure of adjacent surfaces of said front and back walls to facilitate application of recordings by the user of the device, said adjacent surfaces being on additional wall portions fixed to adjacent surfaces of the front and rear walls, all of said walls being integrally united in a single strip, means centrally of the strip hingedly uniting the last named wall portions, said spool supporting members being integral with the front wall and foldable relatively thereto, said members including means for bracing the same to resist downward pull on said spool, supplemental bearing members associated with the first named members, said supplemental bearing members being apertured to receive the first named means, and said first named means being fixed to said spool supporting members.

5. A device as defined in claim 4, wherein said tab forms a footpiece, upon which a child stands in the operation of taking a height measurement.

6. A device for measuring the height of a child and for recording health status of the child, comprising a body portion for attachment to a suitable support, means on the body portion for rotatable support of a spool, thereon, a measuring tape mounted on the spool and adapted to be manually extended from the spool and said device in the operation of taking a height measurement, the body portion having a normally concealed characterized surface, upon which health and treatment status of the child being measured is applied by the user of the device, said body portion including means for guiding the tape in the operation of withdrawing the same from and re-winding the same upon said spool, said body portion including hingedly coupled front and rear portions, said characterized surfaces being on adjacent surfaces of said front and rear portions, the free end of said tape including means forming a fingerpiece and footpiece, and means on the rear portion of the device for concealed support of said last named means.

References Cited in the file of this patent
UNITED STATES PATENTS

| | | |
|---|---|---|
| 1,345,558 | Simmons | July 16, 1920 |
| 1,902,567 | Martin | Mar. 21, 1933 |
| 1,974,085 | Shields | Sept. 18, 1934 |
| 3,020,643 | Moran | Feb. 13, 1962 |